(12) United States Patent
Huet et al.

(10) Patent No.: US 12,526,180 B2
(45) Date of Patent: Jan. 13, 2026

(54) ROOT CAUSE ANALYSIS OF ANOMALOUS EVENTS IN A COMPUTER NETWORK

(71) Applicant: Huawei Technologies Co., Ltd., Shenzhen (CN)

(72) Inventors: Alexis Huet, Boulogne Billancourt (FR); Jose Manuel Navarro Gonzalez, Boulogne Billancourt (FR); Dario Rossi, Boulogne Billancourt (FR)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 47 days.

(21) Appl. No.: 18/593,271

(22) Filed: Mar. 1, 2024

(65) Prior Publication Data

US 2024/0275663 A1     Aug. 15, 2024

Related U.S. Application Data

(63) Continuation of application No. PCT/EP2021/074381, filed on Sep. 3, 2021.

(51) Int. Cl.
*H04L 41/0631* (2022.01)
*H04L 41/0604* (2022.01)
*H04L 41/0677* (2022.01)

(52) U.S. Cl.
CPC ........ *H04L 41/064* (2013.01); *H04L 41/0622* (2013.01); *H04L 41/0677* (2013.01)

(58) Field of Classification Search
None
See application file for complete search history.

(56) References Cited

U.S. PATENT DOCUMENTS

| | | | |
|---|---|---|---|
| 10,002,144 B2 | 6/2018 | Chen et al. | |
| 10,176,033 B1* | 1/2019 | Wang | G06F 11/0793 |
| 10,306,490 B2 | 5/2019 | Ratakonda et al. | |
| 10,601,691 B2 | 3/2020 | Chandrasekaran et al. | |
| 2015/0188752 A1* | 7/2015 | Kudo | G06F 11/0709 |
| | | | 714/37 |
| 2018/0060203 A1* | 3/2018 | Gupta | G06F 11/3058 |

(Continued)

FOREIGN PATENT DOCUMENTS

| | | | |
|---|---|---|---|
| EP | 3223485 B1 | 9/2017 | |
| EP | 3748562 A1 | 12/2020 | |

(Continued)

OTHER PUBLICATIONS

Ya Su et al, "CoFlux: Robustly Correlating KPIs by Fluctuations for Service Troubleshooting" IWQoS 2019, Jun. 24, 25, 2019, total 10 pages.

(Continued)

*Primary Examiner* — Kostas J Katsikis
(74) *Attorney, Agent, or Firm* — Conley Rose, P.C.

(57) ABSTRACT

An apparatus for root cause analysis of anomalous events in a computer network is configured to receive event information related to the anomalous event from a set of devices in the computer network. Further, the apparatus is configured to estimate a total duration of the anomalous event based on the received event information. Then, the apparatus is configured to generate root cause information for the anomalous event based on the estimation of the total duration of the anomalous event.

20 Claims, 9 Drawing Sheets

(56) References Cited

U.S. PATENT DOCUMENTS

2024/0356795 A1* 10/2024 Jividen ................ H04L 41/064

FOREIGN PATENT DOCUMENTS

| EP | 3866394 A1 | 8/2021 |
| WO | 2021151494 A1 | 8/2021 |

OTHER PUBLICATIONS

He Yan et al, "G-RCA:A Generic Root Cause Analysis Platform for Service Quality Management in Large IP Networks," IEEE/ACM Transactions on Networking, vol. 20, No. 6, Dec. 2012, total 14 pages.

Yu Jin et al, "NEVERMIND, the Problem Is Already Fixed: Proactively Detecting and Troubleshooting Customer DSL Problems," Proceedings of the 2010 ACM Conference on Emerging Networking Experiments and Technology, Jan. 1, 2010, total 12 pages.

JMN Gonzalez et al, "Root cause analysis of network failures using machine learning and summarization techniques", IEEE Communications Magazine, Sep. 2017, total 6 pages.

Hansheng Ren et al, "Time-Series Anomaly Detection Service at Microsoft," arXiv:1906.03821v1 [cs.LG] Jun. 10, 2019, total 9 pages.

Fernando Silveira et al, "URCA: Pulling out Anomalies by their Root Causes," IEEE INFOCOM 2010 proceedings, Mar. 14, 2010, total 9 pages.

* cited by examiner

FIG. 4A

| Predicted event duration | Predicted cause | Confidence |
|---|---|---|
| 1 | ■ CPUUsage+FIB_MISS | 95% |
| [2, 10] | ■ CPUUsage+FIB_MISS | 3% |
| [6, 10] | ▨ CPUUsage | 1% |

FIG. 4B

| Predicted event duration | Predicted cause | Confidence |
|---|---|---|
| [2, 10] | ■ CPUUsage+FIB_MISS | 80% |
| [5, 10] | ▨ CPUUsage | 20% |

FIG. 4C

| Predicted event duration | Predicted cause | Confidence |
|---|---|---|
| [5, 10] | ▨ CPUUsage | 80% |

ROOT CAUSE ANALYSIS OF ANOMALOUS EVENTS IN A COMPUTER NETWORK

CROSS-REFERENCE TO RELATED APPLICATIONS

This is a continuation of International Patent Application No. PCT/EP2021/074381 filed on Sep. 3, 2021. The disclosure of the aforementioned application is hereby incorporated by reference in its entirety.

TECHNICAL FIELD

The present disclosure relates to root cause analysis in a computer network. The disclosure provides an apparatus for root cause analysis in a computer network of anomalous events, a corresponding method, and a computer program. The root cause analysis may be used for troubleshooting in the computer network.

BACKGROUND

Network troubleshooting is of major interest for network operators, and reduction of "time to solve", or staff assigned on those tasks, can have a large difference in the money lost during an issue. A better root cause analysis in a computer network may save costs, since the operator time to troubleshoot anomalous events can be reduced.

Anomalous events are typically received by a server whenever an anomaly has been detected by a device in the computer network. An anomaly detection system is typically devoted on detecting the anomalies on the device from a telemetry stream (consisting, in general, of hundreds to ten thousands of key performance indicators (KPIs) per device), and then extracting a reduced set of KPIs consisting of the most relevant dimensions related to the detected anomaly (in the order of tens or less KPIs).

For anomalies received by a server as such anomalous events, a first signal may represent the start of the anomalous event and may be triggered when the anomaly is detected. The end of the anomalous event may trigger another signal to indicate the end of the anomaly.

Exemplary root cause models are static models that identify the root cause from the whole anomalous event. However, in a streaming context, waiting until the end of the anomalous event before considering a root cause is not an option, since some anomalous events can last for a long time and can therefore delay the resolution of the issue.

Another strategy may thus be to communicate with the device at each timestamp, in order to get regular updates of the current status of the anomaly and the KPIs. However, this strategy will induce an incessant back-and-forth between the many devices and the server, which is undesirable.

Another option may thus be to identify the root cause only from the start of the anomaly indicated by the anomalous event. One issue with this strategy, however, is that all anomalous events will be considered only from the perspective of the first instant.

SUMMARY

The present disclosure bases further on the following considerations. An anomalous event may have a pattern that changes over time. This may potentially give more information on the root cause of the anomaly. One major element, for instance, which may be related to the root cause, is the duration of the anomaly, i.e., the window of time the anomalous event is lasting before ending. For example, a main separation of anomalous events can be made between shorter events and longer events. The duration may have a crucial importance in the kind and/or criticality of the anomaly.

Most conventional systems only consider a single root cause output. Some approaches focus on topological aspects between devices, but do not look at multivariate aspects of a stream of data produced by each single device of a set of devices in the computer network.

In view of the above, the present disclosure has the objective to provide an apparatus and a method for performing an improved root cause analysis for anomalous events. One aim is the possibility to perform an adaptive root cause analysis and identification of the anomalous events, without (or with only limited) additional communication with devices in the computer network. A goal of the disclosure is also to provide the root cause analysis apparatus with the potential of scalability and operating with low computational complexity.

These and other objectives are achieved by the features of the independent claims. Advantageous implementations are further defined in the dependent claims.

The present disclosure proposes leveraging information, which is provided by the fact that an anomalous event has not ended yet. This information may be provided implicitly (e.g., whenever an end signal has not been received, the anomalous event can be assumed to continue), and may allow considering different root causes depending on the current duration and/or the estimated total duration of the anomalous event.

A first aspect of this disclosure provides an apparatus for root cause analysis of an anomalous event in a computer network, the apparatus being configured to receive event information related to the anomalous event from a set of devices in the computer network, estimate a total duration of the anomalous event based on the received event information, and generate root cause information for the anomalous event based on the estimation of the total duration of the anomalous event.

An anomalous event may be an anomalous state, which lasts for one or several time units, and is related to an anomaly. It may thus be in opposition to a point-based event, which only gives a static view of a related anomaly, and may typically be the start of said anomaly. The event information for the anomalous event may include a status about the anomalous event, and may be received by the apparatus at the start of the root cause analysis. A notification regarding the end of the anomalous event may, for example, be received when the anomalous event is over.

Notably, the generating of the root cause information may be not exclusively based on the estimated total duration, but may also be based on additional information that may be included in the event information, examples of such additional information being given further below.

The apparatus of the first aspect is able to perform an improved root cause analysis and identification regarding the anomalous event. By leveraging the estimated duration of the anomalous event for generating the root cause information (which may include one or more possible root causes of the anomalous event), the apparatus may be configured to perform an adaptive root cause analysis and identification for the anomalous events. The root cause information may include or indicate at least one root cause of the anomalous event. For example, as the anomalous event goes on, the estimated duration for the anomalous event may change, and so may the root cause information. For this, the apparatus does not need further communication with any device of the set of devices in the computer network (wherein the set of devices may include one or more devices). The apparatus is moreover well scalable and can operate with low computational complexity.

In an implementation form of the first aspect, the event information indicates at least a starting time of the anomalous event.

The starting time of the anomalous event may be used by the apparatus to estimate the total duration of the event.

In an implementation form of the first aspect, the apparatus is further configured to track the current duration of the anomalous event based on the indication of the starting time of the anomalous event included in the event information, update the estimation of the total duration of the anomalous event based on the tracking of the current duration, and update the root cause information for the anomalous event, if the estimation of the total duration of the anomalous event exceeds a determined threshold duration.

The apparatus is able to leverage the information regarding the current duration of the anomalous event to generate the root cause information, even before the end of the anomalous event, and may thus allow better and faster root cause identification and solution of the issue.

In an implementation form of the first aspect, the apparatus is further configured to track the current duration of the anomalous event until an end of the anomalous event, and provide final root cause information for the anomalous event based on the total duration of the anomalous event determined at the end of the anomalous event.

The final root cause information may indicate the real root cause of the anomalous event, while the root cause information generated before may indicate a possible root cause. Of course, the possible root cause may turn out to be the real root cause in the end.

In an implementation form of the first aspect, the root cause information for the anomalous event comprises one or more possible root causes for the anomalous event.

The possible root causes may be predicted or estimated, and may provide the possibility to fix the anomaly and remove the root cause as early as possible.

In an implementation form of the first aspect, the root cause information further comprises a confidence value for each of the one or more possible root causes for the anomalous event in the root cause information.

This allows evaluating different possible root causes for their probability, and may lead to a faster removal of the anomaly and the root cause. The root cause information including the one or more root causes associated with the confidence values is referred to as a "scenario" in this disclosure, which may be valid until there is an update of the root cause information and/or new event information available.

In an implementation form of the first aspect, updating the root cause information for the anomalous event comprises at least one of adding one or more possible root causes to the root cause information, deleting one or more possible root causes from the root cause information, modifying the confidence value of each of one or more possible root causes in the root cause information.

The updating may be done when the event information changes or when the current duration of the anomalous event leads to a new estimate of the total duration of the anomalous event. The updating of the root cause information may lead to updated one or more root causes, which may each be associated with a confidence value. This may accordingly lead to a new scenario with different possible root causes and/or probabilities.

In an implementation form of the first aspect, the apparatus is further configured to request updated event information from the set of devices, if the confidence value for each possible root cause in the root cause information is below a determined threshold confidence value, update the estimation of the total duration of the anomalous event based on the updated event information, and update the root cause information for the anomalous event based on the updated estimation of the total duration of the anomalous event.

In this way, the apparatus can overcome a situation, in which no root cause can be identified with a high (or enough) probability as a possible root cause of the anomalous event.

In an implementation form of the first aspect, the event information comprises at least one of an identification of each device in the set of devices, a current anomaly detection score associated with the anomalous event.

This may support the root cause analysis. The generated root cause information may be based on the current anomaly detection score.

In an implementation form of the first aspect, the event information comprises a set of scored features of the anomalous event, each scored feature of the anomalous event comprising a feature of the anomalous event that is associated with a score indicating an influence of this feature to the root cause of the anomalous event.

This may facilitate the generating of the root cause information, for instance, the determination of one or more possible root causes for the anomalous event. For instance, the features enable an easy comparison with features, for instance, of past anomalous events or other anomalous events, which may be associated with previously determined root cause information or root causes.

In an implementation form of the first aspect, the apparatus is configured to generate the root cause information for the anomalous event based further on a set of past anomalous events, wherein each past anomalous event of the set of past anomalous events has a known total duration of the past anomalous event.

The apparatus can thus leverage history information, and may learn from past events, in order to produce more precise root cause information.

In an implementation form of the first aspect, the apparatus is further configured to query a database using the received event information and/or the updated event information related to the anomalous event, obtain past event information related to the set of past anomalous events in response to the query, and generate the root cause information and/or update the root cause information for the anomalous event based further on the obtained past event information.

The database may be built in advance of the root cause analysis, and may then support the apparatus in generating more accurate root cause information.

In an implementation form of the first aspect, the past event information comprises one or more scored features for each past anomalous event in the set of past anomalous events, each scored feature of a past anomalous event comprising a feature of said past anomalous event that is associated with a score indicating an influence of said feature to the root cause of said past anomalous event.

This enables an easy but precise comparison of past anomalous events, and their real root causes, with the present anomalous event and its possible root causes.

In an implementation form of the first aspect, the past event information further comprises cluster information regarding one or more clusters of the scored features of the set of past anomalous events, each cluster representing a different possible root cause, and each scored feature of a respective cluster having a distance to a centroid of the respective cluster.

In an implementation form of the first aspect, the past event information further comprises, for each cluster indicated by the cluster information, a distribution of the total durations of the past anomalous events corresponding to the scored features of said cluster.

In an implementation form of the first aspect, generating the root cause information for the anomalous event based on the event information comprises comparing the set of scored features of the anomalous event included in the event information with the scored features of set of past anomalous events in the past event information, determining one or more clusters for the set of scored features of the anomalous event based on the result of the comparing and estimated distances of the scored features of the set of scored features to the centroids of the one or more clusters, estimating the total duration of the anomalous event based on the total durations of the past anomalous events corresponding to the scored features of said cluster, and generating the root cause information for the anomalous event based on at least one of the root causes associated with the one or more determined clusters and the estimation of the total duration of the anomalous event.

The above-described clustering provides a particularly efficient and reliable way to determine root cause information for the anomalous event, based on features and root causes of past anomalous events.

A second aspect of this disclosure provides a method for root cause analysis of an anomalous event in a computer network, the method comprising receiving event information related to the anomalous event from a set of devices in the computer network, wherein the event information indicates at least a starting time of the anomalous event, estimating a total duration of the anomalous event based on the received event information, and generating root cause information for the anomalous event based on the estimation of the total duration of the anomalous event.

In an implementation form of the second aspect, the event information indicates at least a starting time of the anomalous event.

In an implementation form of the second aspect, the method further comprises tracking the current duration of the anomalous event based on the indication of the starting time of the anomalous event included in the event information, updating the estimation of the total duration of the anomalous event based on the tracking of the current duration, and updating the root cause information for the anomalous event, if the estimation of the total duration of the anomalous event exceeds a determined threshold duration.

In an implementation form of the second aspect, the method further comprises tracking the current duration of the anomalous event until an end of the anomalous event, and provide final root cause information for the anomalous event based on the total duration of the anomalous event determined at the end of the anomalous event.

In an implementation form of the second aspect, the root cause information for the anomalous event comprises one or more possible root causes for the anomalous event.

In an implementation form of the second aspect, the root cause information further comprises a confidence value for each of the one or more possible root causes for the anomalous event in the root cause information.

In an implementation form of the second aspect, updating the root cause information for the anomalous event comprises at least one of adding one or more possible root causes to the root cause information, deleting one or more possible root causes from the root cause information, or modifying the confidence value of each of one or more possible root causes in the root cause information.

In an implementation form of the second aspect, the method further comprises requesting updated event information from the set of devices, if the confidence value for each possible root cause in the root cause information is below a determined threshold confidence value, updating the estimation of the total duration of the anomalous event based on the updated event information, and updating the root cause information for the anomalous event based on the updated estimation of the total duration of the anomalous event.

In an implementation form of the second aspect, the event information comprises at least one of an identification of each device in the set of devices, or a current anomaly detection score associated with the anomalous event.

In an implementation form of the second aspect, the event information comprises a set of scored features of the anomalous event, each scored feature of the anomalous event comprising a feature of the anomalous event that is associated with a score indicating an influence of this feature to the root cause of the anomalous event.

In an implementation form of the second aspect, the method comprises generating the root cause information for the anomalous event based further on a set of past anomalous events, wherein each past anomalous event of the set of past anomalous events has a known total duration of the past anomalous event.

In an implementation form of the second aspect, the method comprises querying a database using the received event information and/or the updated event information related to the anomalous event, obtaining past event information related to the set of past anomalous events in response to the query, and generating the root cause information and/or update the root cause information for the anomalous event based further on the obtained past event information.

In an implementation form of the second aspect, the past event information comprises one or more scored features for each past anomalous event in the set of past anomalous events, each scored feature of a past anomalous event comprising a feature of said past anomalous event that is associated with a score indicating an influence of said feature to the root cause of said past anomalous event.

In an implementation form of the second aspect, the past event information further comprises cluster information regarding one or more clusters of the scored features of the set of past anomalous events, each cluster representing a different possible root cause, and each scored feature of a respective cluster having a distance to a centroid of the respective cluster.

In an implementation form of the second aspect, the past event information further comprises, for each cluster indicated by the cluster information, a distribution of the total durations of the past anomalous events corresponding to the scored features of said cluster.

In an implementation form of the second aspect, generating the root cause information for the anomalous event based on the event information comprises comparing the set of scored features of the anomalous event included in the event information with the scored features of set of past anomalous events in the past event information, determining one or more clusters for the set of scored features of the anomalous event based on the result of the comparing and estimated distances of the scored features of the set of scored features to the centroids of the one or more clusters, estimating the total duration of the anomalous event based on the total durations of the past anomalous events corresponding to the scored features of said cluster, and generating the root cause information for the anomalous event based on at least one of the root causes associated with the one or more determined clusters and the estimation of the total duration of the anomalous event.

The method of the second aspect and its implementation forms achieve all advantages and effects of the apparatus of the first aspect and its respective implementation forms.

A third aspect of this disclosure provides a computer program comprising a program code for performing the method according to the second aspect or any of its implementation forms, when the program code is executed on a processor.

It has to be noted that all devices, elements, units and means described in the present application could be implemented in the software or hardware elements or any kind of combination thereof. All steps which are performed by the various entities described in the present application as well as the functionalities described to be performed by the various entities are intended to mean that the respective entity is adapted to or configured to perform the respective steps and functionalities. Even if, in the following description of specific embodiments, a specific functionality or step to be performed by external entities is not reflected in the description of a specific detailed element of that entity which performs that specific step or functionality, it should be clear for a skilled person that these methods and functionalities can be implemented in respective software or hardware elements, or any kind of combination thereof.

BRIEF DESCRIPTION OF DRAWINGS

The above described aspects and implementation forms will be explained in the following description of specific embodiments in relation to the enclosed drawings. The enclosed drawings are as follows.

FIG. 4A, FIG. 4B, and FIG. 4C show root cause information for different scenarios.

DETAILED DESCRIPTION OF EMBODIMENTS

Figure 1:
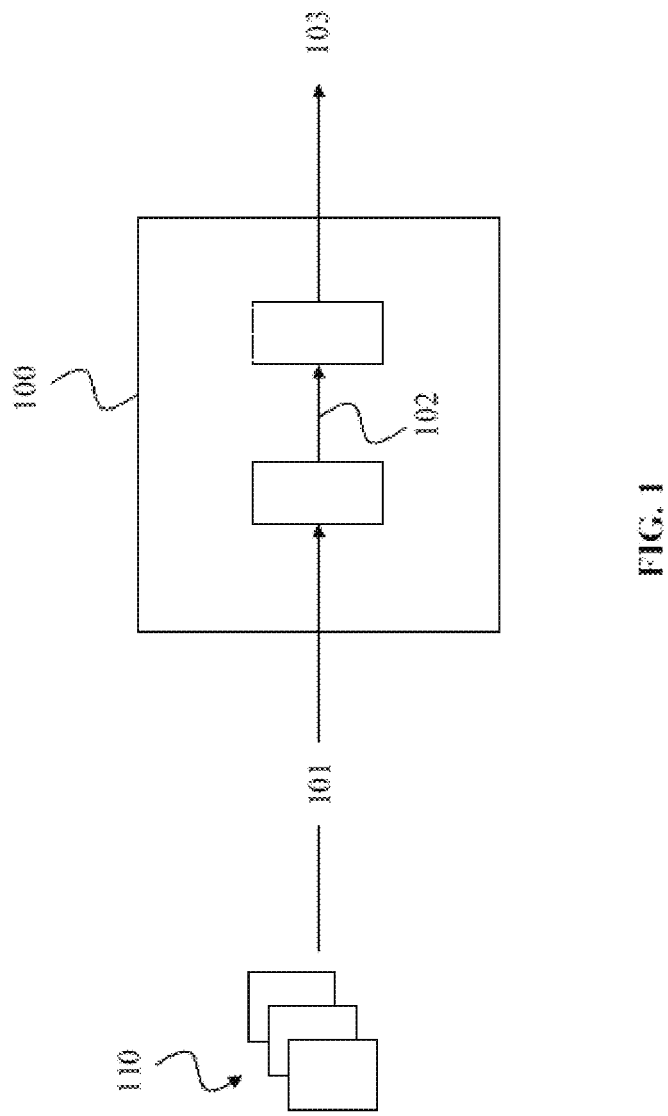
FIG. 1 shows an apparatus according to an embodiment of this disclosure.

FIG. 1 shows an apparatus 100 according to an embodiment of this disclosure. The apparatus 100 is configured to perform a root cause analysis of an anomalous event in a computer network. The root cause analysis may include root cause identification. The apparatus 100 may be arranged in the computer network, or may be arranged outside the computer network and receive information from the computer network.

The apparatus 100 may receive event information 101 related to an anomalous event from a set of devices 110 in the computer network, for instance, from one or more devices in the computer network. The devices of the set of devices 110 may have detected an anomaly and thus send the event information 101. The event information 101 may, for example, include or indicate a starting time of the anomalous event. The apparatus 100 may make a root cause analysis of this anomalous event using the event information 101.

The apparatus 100 is configured to estimate a total duration 102 of the anomalous event based on the received event information 101. For example, the apparatus 100 may estimate the total duration 102 of the anomalous event based on the starting time of the anomalous event, which may be indicated by the event information 101. For instance, the apparatus 100 may track a current duration of the anomalous event, based on the starting time of the anomalous event indicated by the event information 101. The apparatus 100 may further estimate the total duration 102 based on the tracked current duration of the anomalous event. The apparatus 100 may also repeat the estimation of the total duration 102 more than once, for instance, using the tracked current duration (which changes), wherein the estimated total duration 102 may also change as a consequence.

Further, the apparatus 100 is configured to generate root cause information 103 for the anomalous event based on the estimation of the total duration 102 of the anomalous event. The apparatus 100 may further update the root cause information 103, if the estimation of the total duration 102 of the anomalous event changes, for instance as described above. For example, if the estimated total duration 102 exceeds a determined threshold duration. The root cause information 103 may include at least one possible root cause for the anomalous event, wherein each possible root cause may further be associated with a confidence value, for instance, a probability that the possible root cause is the real root cause for the anomalous event.

The apparatus 100 may comprise a processor or processing circuitry configured to perform, conduct or initiate the various operations of the apparatus 100 described above or generally in this disclosure. The processing circuitry may comprise hardware and/or the processing circuitry may be controlled by software. The hardware may comprise analog circuitry or digital circuitry, or both analog and digital circuitry. The digital circuitry may comprise components such as application-specific integrated circuits (ASICs), field-programmable gate arrays (FPGAs), digital signal processors (DSPs), or multi-purpose processors. The apparatus 100 may further comprise memory circuitry, which stores one or more instruction(s) that can be executed by the processor or by the processing circuitry, in particular under control of the software. For instance, the memory circuitry may comprise a non-transitory storage medium storing executable software code which, when executed by the processor or the processing circuitry, causes the various operations of the apparatus 100 to be performed. In one embodiment, the processing circuitry comprises one or more processors and a non-transitory memory connected to the one or more processors. The non-transitory memory may carry executable program code which, when executed by the one or more processors, causes the apparatus 100 to perform, conduct or initiate the operations or methods described above or generally in this disclosure.

As described above, this disclosure provides an apparatus 100 that is configured to collect event information 101 related to an anomalous event (from the set of devices 110), and that may be further configured to analyze and identify or forecast root cause information 103 and at least one possible root cause for the anomalous event.

The apparatus 100 may also provide a possible root cause evolution (a change of the one or more possible root causes) based on the event information 101, wherein the event information 101 may be continuously received or may be updated by the set of devices 110 and sent to the apparatus 100. For instance, the apparatus 100 may update the root cause information 103 and the possible root cause(s) included therein when the anomalous event continues. For example, updating the root cause information 103 for the anomalous event may comprise at least one of adding one or more possible root causes to the root cause information 103, deleting one or more possible root causes from the root cause information 103, modifying a confidence value of each of one or more possible root causes in the root cause information 103. The confidence value(s) may be included in the generated root cause information 103.

The event information 101 may comprise a current known duration of the anomalous event. The event information 101 may also comprise some other (e.g., partial) information related to the anomalous event. The event information 101 may possibly include a list of selected features, a list of associated scores for those features, a list of associated last value for those features, etc. For example, the event information 101 may comprise a set of scored features of the anomalous event, wherein each scored feature of the anomalous event comprises a feature of the anomalous event that is associated with a score, wherein the score indicates an influence of this feature to the root cause of the anomalous event.

Regarding the determination of the root cause information 103 for the anomalous event, and/or the forecasting of one or more possible root causes, the apparatus 100 may leverage a fingerprinting of past identified anomalous events. For example, the apparatus 100 may be configured to generate the root cause information 103 for the anomalous event based further on a set of past anomalous events. Each past anomalous event of the set of past anomalous events may have a known total duration, and may also have certain features.

In addition, a mechanism that indicates a probability or confidence of the identified one or more possible root causes can be optionally implemented by the apparatus 100. For example, the root cause information 103 may further comprise a confidence value for each of the one or more possible root causes for the anomalous event, which may be included in the root cause information 103. If the confidence value is not reaching a certain threshold, the apparatus 100 may ask for an update of the event information 101. For example, the apparatus 100 may request updated event information 101 from the set of devices 110, if the confidence value for each possible root cause in the root cause information 103 is below the certain threshold of confidence value. Then, the apparatus 100 may update the estimation of the total duration 102 of the anomalous event based on the updated event information 101. Further, the apparatus 100 may update the root cause information 103 for the anomalous event, including the one or more possible root causes and their confidence values, based on the updated estimation of the total duration 102 of the anomalous event.

Optionally, the identification of the possible root causes can include the query to a knowledge base, in order to provide further information that can be used for the root cause analysis. For example, the apparatus 100 may query a knowledge base or a database using the received event information 101 and/or using the updated event information 101, related to the anomalous event. The additional information received in response to this query may comprise past event information related to the set of past anomalous events. The apparatus 100 may then generate the root cause information 103 and/or may update the root cause information 103 for the anomalous event based on the past event information obtained.

Figure 2:
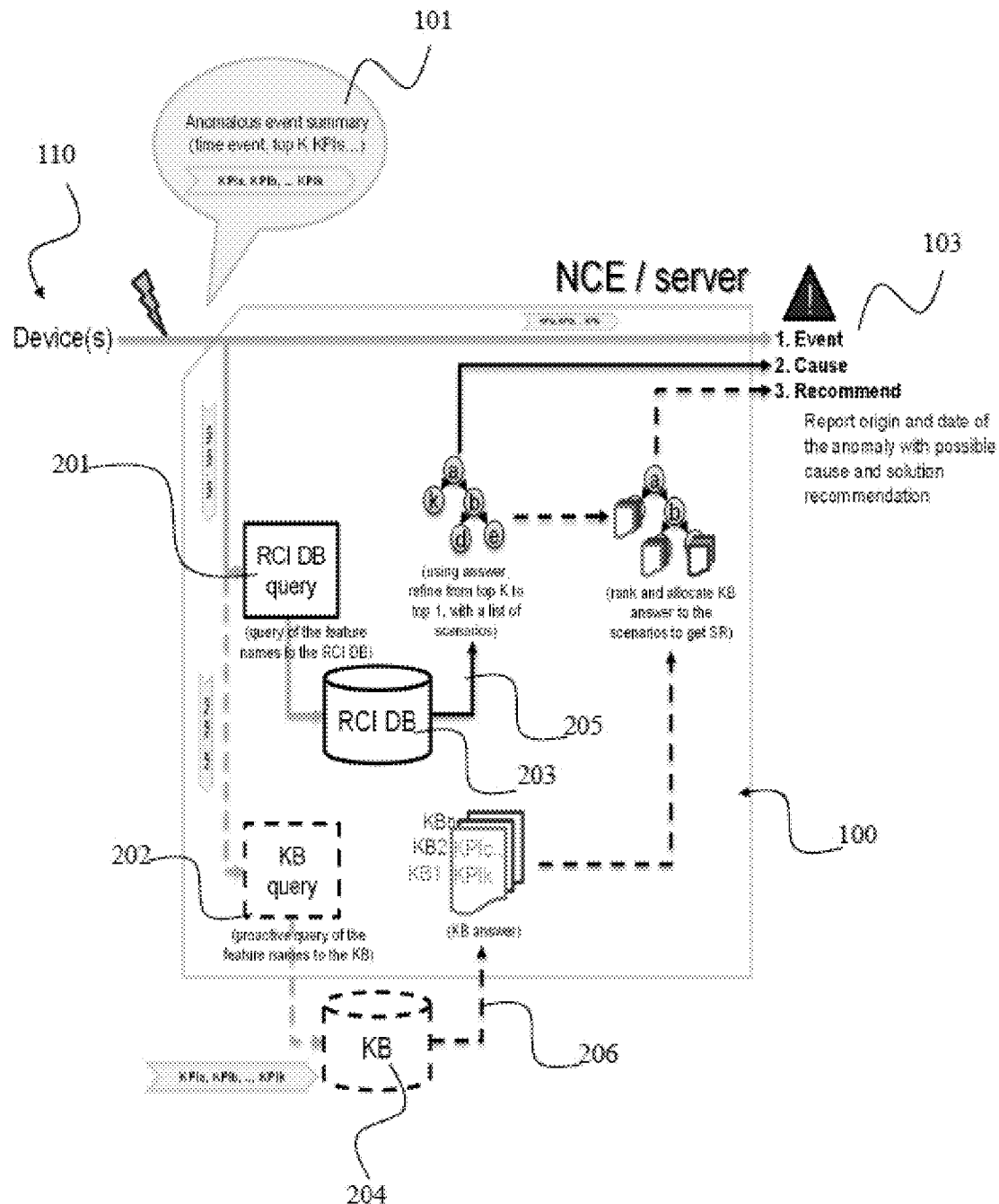
FIG. 2 shows details of an apparatus according to an embodiment of this disclosure.

FIG. 2 shows an apparatus 100 according to an embodiment of this disclosure, which builds on the embodiment shown in FIG. 1. Same elements in FIG. 1 and FIG. 2 share the same reference signs and may be implemented in an identical manner.

FIG. 2 shows that in the apparatus 100, which may be a server tailored for streaming purposes or may be included in a server, three directions may be taken, once an anomalous event is received by one of the devices of the set of devices 110.

First, the apparatus 100 is informed about the anomalous event. Then, a root cause identification (RCI) subsystem of the apparatus 100 may focus the event information 101 (wherein, e.g., the event information 101 may comprise a reduced set of KPIs with related anomalous scores), may augment the event information 101, and may perform additional computations to provide hints regarding the possible root cause(s) and their evolution scenarios. An evolution of scenarios may mean that the apparatus 100 can update the most likely possible root cause(s) depending on the data currently available, this data commonly including the estimated and updated estimated total duration 102 of the anomalous event. For instance, root cause information 103 generated at a first time point may include a first set of possible root causes and may represent a first scenario. Root cause information 103 generated or updated at a second time point may include a second set of possible root causes and may represent a second scenario. A change of the possible root causes from the first scenario to the second scenario may represent an evolution of the scenario. This allows the apparatus 100 to handle reactive root cause analysis based on the total duration 102 of the anomalous event without the need to contact back the device.

Optionally, the subsystem of the apparatus 100 may pre-select potentially relevant additional information, which may include past event information. To this end, the apparatus 100 may request past event information. The subsystem of the apparatus 100 may query 201 an internal database 203 of the apparatus 100 using the received event information 101 and/or updated event information 101. The query may return past event information 205, which may be used to generate or update the root cause information 103 by the apparatus 100. For example, the root cause information 103 may be generated based on the past event information 205 received from the database 203 and/or received by the answer 206 from a knowledge base (KB) 204.

The apparatus 100 may also obtain an answer 206 (to a request or query 202) from the KB 204, which may be external of the apparatus 100. The answer 206 may also include past event information. The past event information may include information on multiple past events. The information of the multiple past events, i.e., the content of the KB answer 206, may be ranked. For instance, it may be ranked once a root cause identification step is completed.

In a streaming case, wherein the apparatus 100 is configured for streaming data, an ongoing anomalous event can be identified as an anomalous event before its end. In that case, the apparatus 100 may quickly react and propose root cause information 103 including possible root causes for the anomalous event. Then, for handling possible changes of the event information 101 over time, the apparatus 100 may update the root cause information 103 and the possible root causes included therein.

Below is shown, as a table, an example of an output (of a certain scenario) that can be produced by the apparatus 100, compared with a conventional static output (left and middle columns):

| Static single output | Static multiple output | Scenario (tailored for streaming |
|---|---|---|
| a single element (such as a string) is output ["CPU Usage"] | a vector of elements with corresponding probabilities is output ["CPU Usage" 90%, "FIB miss" 10%] | structured output with a time component, indicating how the output should be presented depending on the future change of the current anomalous event Example: Current time: ["CPU Usage" 90%, "FIB miss" 10%] If the event is still alive after 3 minutes: ["Drop packet" 95%, "CPU Usage" 5%] ... |

As can be observed in the bottom-right cell of the above table, which illustrates a scenario of root cause information 103 generated by the apparatus 100, the output may be a structured output. The output may indicate how the possible root cause(s) is or are now in this scenario. The output may also indicate how the possible root cause(s) could change(s), if the anomalous event is still alive after a certain time, i.e., if the anomalous event lasts more than this certain time and the scenario changes.

The actual creation of the root cause information 103, representing a current scenario, by the apparatus 100 may be based on the fingerprinting of past event information 205 regarding to past anomalous events, for which the final total duration of the corresponding anomaly is known. Given a new anomalous event incoming (represented by new event information 101 received by the apparatus 100 from the set of devices 110), a proximity of this anomalous event to the fingerprint base may provide the possible root causes for this anomalous event. Statistical properties on the total duration of past anomalous events may provide an evolution of the possible root cause(s) for the anomalous event over time, i.e., may lead to different scenarios at different time points.

In the following, a detailed exemplary implementation of a possible root cause analysis and identification is described. A first part of the implementation may build the database 203 (see FIG. 2), while other parts of the implementation describe the possible functioning of the apparatus 100 when a new anomalous event is incoming.

In the first part of the exemplary implementation (which may be separate from the other parts of the implementation), one or more past anomalous events may be extracted, for example, from a data set with 2000 multivariate series. These past anomalous events may be used to build the database 203. For example, the past anomalous events may be clustered to build the database 203. The database 203 may comprise a list of the past anomalous events. Each past anomalous event may be described by the total duration of the past anomalous event (e.g., in minutes), and optionally a list of scored features (or one or more scoring vectors, wherein each scoring vector comprises one or more scored features). The scored features or scoring vectors may comprise the most representative features of the anomalous event, and may each be assigned with a real score. Thereby, a greater score may indicate a larger weight of influence of this feature to the root cause of the anomalous event.

While it may be beneficial to make the database 203 as large as possible (since also rare anomalous events may be identified), there is no need to update the database 203 frequently. The update process of the database therefore does not need to be fast (for instance, could be only yearly), nor does it have to be fully automated.

The database 203 may produce and/or may store different kinds of past event information 205, for instance, for different past anomalous events or types of past anomalous events related to different root causes. For instance, the past event information 205 may comprise one or more scored features for each past anomalous event. The past event information 205 may further comprise cluster information regarding one or more clusters of the scored features of the set of past anomalous events 205. Each cluster may represent a different possible root cause, and each scored feature of a respective cluster may have a distance to a centroid of the respective cluster. The scored features in the database 203 may be clustered into a limited number of categories identified as the possible root causes. Various clustering methods are possible, for instance, to identify patterns of the scored features. A first option is to apply the clustering directly to the scored features themselves, for example, using classic clustering algorithms based, e.g., distance or density. Alternatively, lists of scored features or vectors of scored features may be simplified into a binary vector (for instance, comprising the presence or not of each feature of the anomalous event). This binary vector may be further compressed using projection techniques like singular value decomposition (SVD) or other techniques. At the end, for any possible scored feature, a distance between this scored feature and each cluster can be computed, possibly normalized to give a probability to be in each cluster.

Further, a distribution of the durations of the past anomalous events for each cluster may be computed. For example, the past event information 205 may further comprise, for each cluster indicated by the cluster information, a distribution of the total durations of the past anomalous events corresponding to the scored features of said cluster.

Figures 3A, 3B:
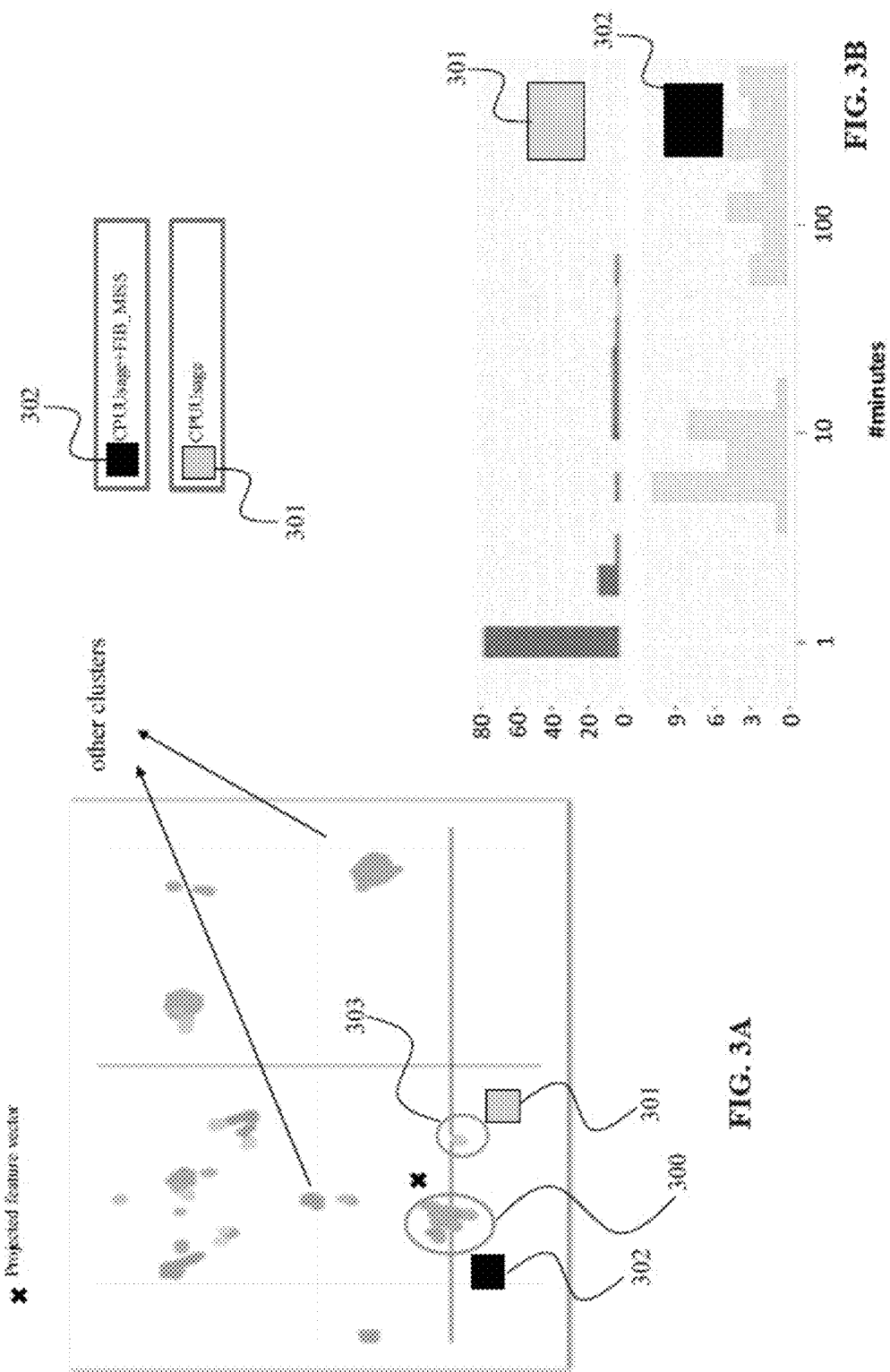
FIG. 3A illustrates a clustering of scored features of anomalous events.
FIG. 3B illustrates a length of anomalous events related to different root causes.

To illustrate the clustering, each past event has a corresponding scored features (potentially defined in a high dimensional space) that may be projected into a two dimensional space using projection techniques giving a visual representation. Each scored feature (or vector of scored features) may be represented by a point in this representation, each point corresponding to one event, and may belong to a cluster. An example illustration of such a two-dimensional space representation is shown in FIG. 3A. A first cluster 300 may be associated with a first root cause 302. Another cluster 303 may be associated with a second root cause 301.

To illustrate the total duration of the past anomalous events, a distribution for the two clusters 300, 303 is further shown in FIG. 3B. For these clusters 300, 303 the distribution of the durations of the past anomalous events associated with the clusters 300, 303, is represented.

In a further part of the exemplary implementation, the apparatus 100 may begin a root cause analysis procedure, when an anomalous event information 101 is incoming to the apparatus 100.

The event information 101, which is received by the apparatus 100 from one or more devices of the set of devices 110 for an anomalous event, may include one or more of the following: an identification (ID) of the device, a start (time) of the anomalous event, a current anomaly detection score (e.g., provided by an anomaly detection system located on the device), a current duration of the anomalous event, a current list or vector of scored features of the anomalous event. This may comprise the most representative features of the anomalous event. The scores may indicate the influence of each feature to the root cause of the anomalous event.

This event information 101 enables the apparatus 100 to estimate the total duration 102 of the anomalous event. The event information 101 may also enable the apparatus 100 to query the database 203. The apparatus 100 may send the query to the database 203 using the event information 101. This may return past event information 205. The apparatus 100 may then generate the root cause information 103 based on the total duration 102 and optionally the past event information 205 (or may estimate the total duration 102 based on the event information 101 and the past event information 205).

The apparatus 100 may further be configured to compare scored features in the event information 101 with similar or identical features in the database 203. For example, the apparatus 100 may compare a set of scored features of the anomalous event included in the event information 101 with the scored features of a set of past anomalous events in the past event information 205. Then, the apparatus 100 may be configured to determine one or more clusters for the set of scored features of the anomalous event based on the result of the comparing and estimated distances of the scored features of the set of scored features to the centroids of the one or more clusters. From the distance of these scored features to cluster centroids, the closest clusters may be identified with corresponding probability. Optionally, the apparatus 100 may estimate the total duration 102 of the anomalous event based on the total durations of the past anomalous events corresponding to the scored features of said cluster. Further, the apparatus 100 may generate the root cause information 103 for the anomalous event based on at least one of the root causes associated with the one or more determined clusters and the estimation of the total duration 102 of the anomalous event. For example, CPUUsage+FIB_MISS cluster can be associated with a probability of 98%, CPUUsage with a probability of 2%, and other clusters with a probability of less than 1%. CPUUsage corresponds to a generic anomaly of the CPU usage, whereas CPUUsage+FIB_MISS corresponds to a central processing unit (CPU) usage increase combined with an issue in the forwarding information base (FIB).

For each cluster, the distribution of the durations 102 of the anomalous events corresponding to the scored features may be known. Thus, it may be possible to update the probability of each joint event (joining duration and cause to update the probabilities), as shown in FIG. 4A. In particular, FIG. 4A shows root cause information 103 including possible event durations, possible root causes 401 and corresponding confidence values 402. FIG. 4A shows an exemplary first scenario.

In particular, the tables shown in FIGS. 4A, 4B and 4C can be understood as follows, depending on the actual duration of the ongoing anomalous event.

First—as illustrated in FIG. 4A—the anomalous event has not reached 1 minute, then the most probable (with 95% confidence) is to estimate a total event duration 102 of 1 minute with a predicted root cause CPUUsage+FIB_MISS. Given that 95% is large enough, the confidence in the result is high and CPUUsage+FIB_MISS may be provided as the possible root cause 401. If the anomalous event ends after one minute (e.g., triggered by the device if ended), the apparatus 100 may notify the end of the event and confirm the previously determined possible root cause 401. If the event is lasting more than one minute, the apparatus 100 may proceed by updating the table, based on the knowledge that the anomalous event is lasting more than one minute.

This update may be done without further communication with the device, and is illustrated in FIG. 4B. FIG. 4B shows an exemplary second scenario. There is still confidence in the same possible root cause 401 (high confidence value 402), and the apparatus 100 does not need to be contacted again at that time. If the anomalous event ends before 5 minutes, the apparatus 100 notifies the end of the anomalous event and confirms the possible root cause 401. If the anomalous event is lasting more than 5 minutes, the apparatus 100 may proceed by updating the table, based on the knowledge that the anomalous event is lasting more than 5 minutes.

As shown in FIG. 4C, at that point, the most probable possible root cause 401 may be CPUUsage, but the conditional confidence value 402 is not reaching a specified threshold. The apparatus 100 may this request an update of event information 101, for instance, including updated scored features of the anomalous event. FIG. 4C shows an exemplary third scenario.

The apparatus 100 may accordingly be able to track the current duration of the anomalous event, and may update the estimation of the total duration 102 of the anomalous event based on the tracking of the current duration, and may update the root cause information 103 for the anomalous event, including the possible root causes. For example, the apparatus 100 may add, delete, or modify root causes of the root cause information 103.

Figure 5:
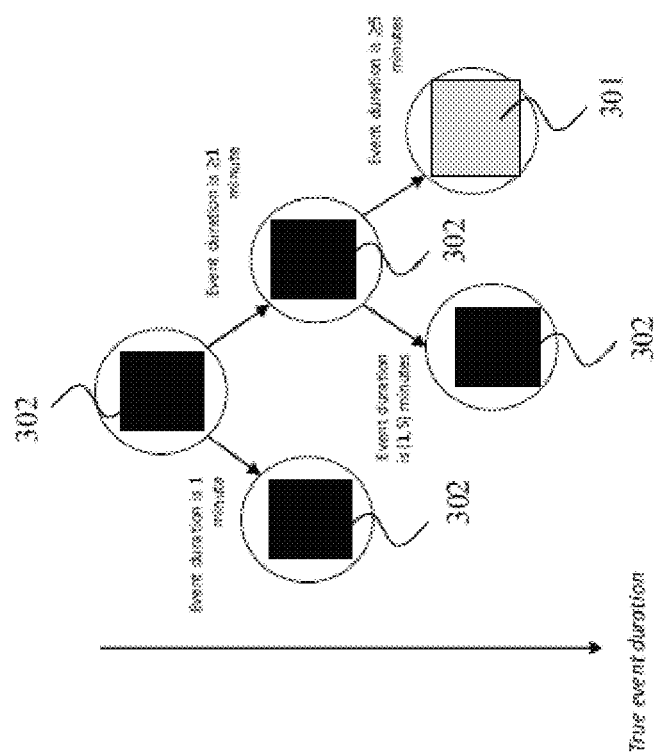
FIG. 5 shows a tree-representation of different scenarios evolving over time, each scenario being associated with a most probable root cause.

A possible representation of the scenario evolution can be obtained with a tree, as shown in FIG. 5. In particular, FIG. 5 illustrates by the arrow a proceeding current duration of the anomalous event. Depending on the current duration, the apparatus 100 may estimate the total duration 102 of the event, and may modify a most probable root cause (here from a first root cause 302 to a second root cause 301). Thus, the scenario may change with time.

The following embodiment details the knowledge base, which the apparatus 100 may use. The sources of the KB 204 can be websites like https://support.huawei.com/ or https://forum.huawei.com/. For indexing, the KB 204 may store the content of each article along with a pre-computed index for queries. The queries may be done in parallel by the subsystem of the apparatus 100 (and as such are not a bottleneck), and may include the device name (of the set of devices 110 form which the event information 101 was received) and, if available, feature names of the scored features of the anomalous event. The result of the KB 204 may be ranked according to relevance, and may be appended to the different scenarios. The relevance of a result may be based on keyword matching the predicted root cause, relevance of the answer based on number of views and/or stars, etc.

Figures 6A, 6B:
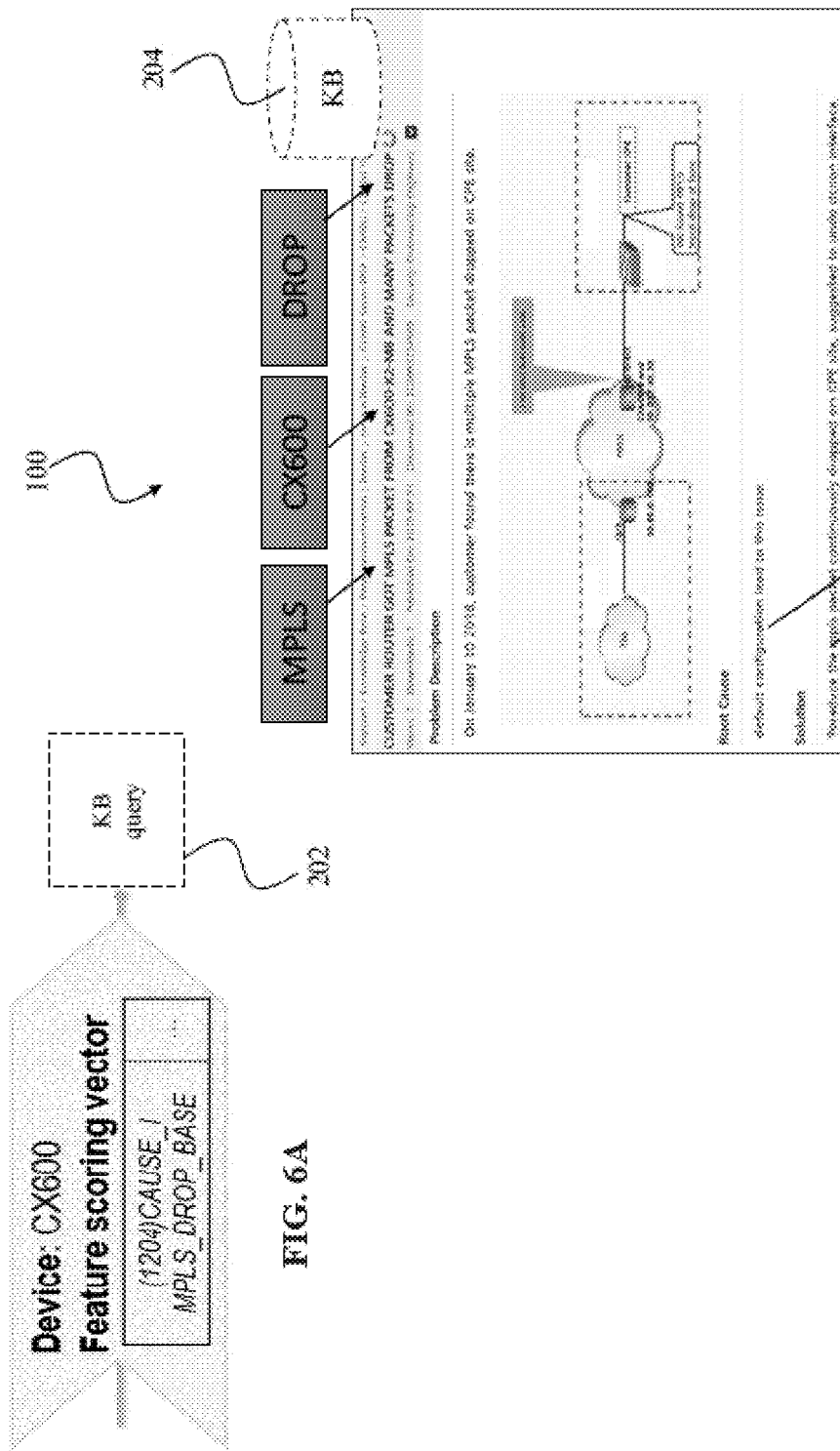
FIG. 6A and FIG. 6B show exemplary implementations of an apparatus according to an embodiment.

For example, given the anomalous event summary shown in FIG. 6A, received as event information 101, the device name "CX600" and feature names "MPLS_DROP_BASE" can be identified, and may lead to identifying multiple pages containing those keywords, as shown in FIG. 6B. The feature names "MPLS_DROP_BASE" is corresponding to a drop in the Multiprotocol Label Switching (MPLS). The relevance of each page may be finally assessed by the general relevance and the agreement with the current node of the scenario.

The following embodiment details the use of scenarios in a case where the emphasis is done on the dichotomy between short and longer anomalous events. In this case, only two durations of events are considered: short and long anomalous events. This may prevent the subsystem of the apparatus 100 to update too frequently, by updating only for one major suggestion.

Figure 7A:
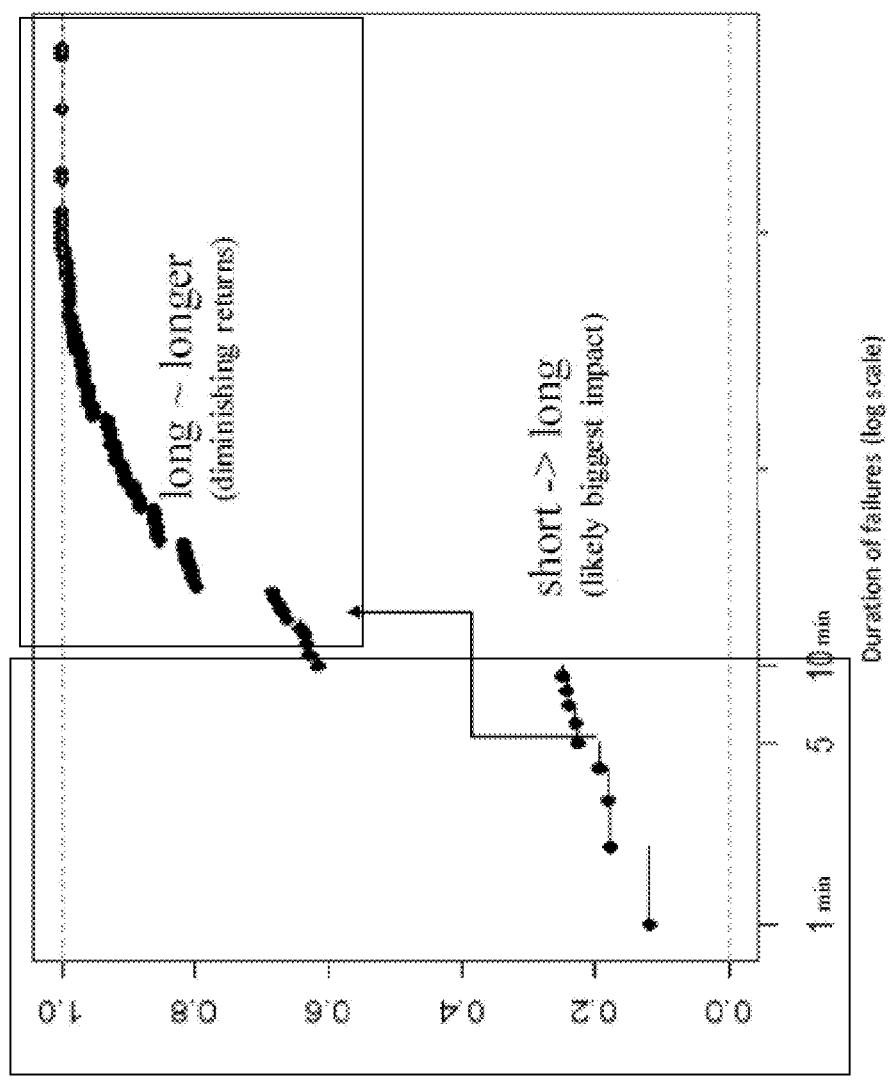
FIG. 7A and FIG. 7B show accumulations of observed events of different duration.
Figure 7B:
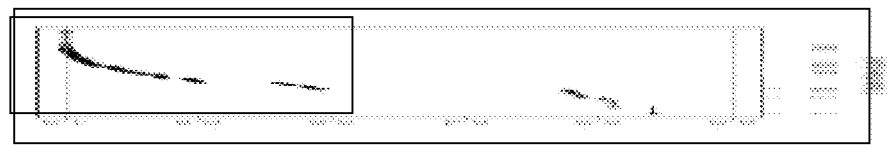

The differences between short and long anomalous events are as follows. It was mentioned previously that the duration of an anomalous event has a significance. As shown in FIG. 7A and FIG. 7B, the events duration can be categorized into transient events (left side) and longer events (right side), wherein the time is indicated on the x-axis. This categorization may likely have the largest impact (compared to other possible categorizations). From the cumulated distribution function of the observed durations of the events detected by the anomaly detection system, FIG. 7A may be obtained.

It may be observed that most of the anomalous events have small duration and are transient, e.g., a temporary CPU usage peak. By only looking at the most probable root cause independently of event duration (without considering the evolving duration of the anomalous event), previous systems end in highlighting mostly those transient events (class imbalance). A still significant fraction of anomalous events last much longer, for which the apparatus 100 provides significant benefits. These events can be a sign of a more complex or critical anomaly (as the problem is not transient), and a specific management will help in faster anomaly identification. The timescale of the apparatus 100 allows for refinement of the root cause analysis. It is not meant to give updated answer in real time or frequently (e.g., refresh every second), but only if structurally different and significant causes are more likely (e.g., in light of new data coming after the first few minutes).

Based on this class imbalance, for a new anomalous event, the anomalous event is more probably a transient minor anomalous event, but it can also be, with a smaller probability, a more critical long anomalous event. So, often the root cause identification by the apparatus 100 will complete in one step, as the anomalous event is short lived and there will be no new telemetry to collect. However, in the case the anomalous events last longer, introducing different scenarios then allows the expert to get further information for troubleshooting this more complex cases. Taking explicitly into account running event duration allows not being "polluted" by the various transient anomalies of the same cluster (which is not possible to isolate as a specific cluster at first, since the final length of the event is always unknown at first in the streaming context).

Furthermore, the apparatus 100 does not requires frequent changes of the root cause identification, which that could be confusing for the expert (biggest difference is from short to long events, so only at the beginning, long vs longer likely yield minor changes only) and reduces the communication between the server and the device (possibly updating the scenarios in case of low confidence as seen in a previous embodiment).

Figure 8:
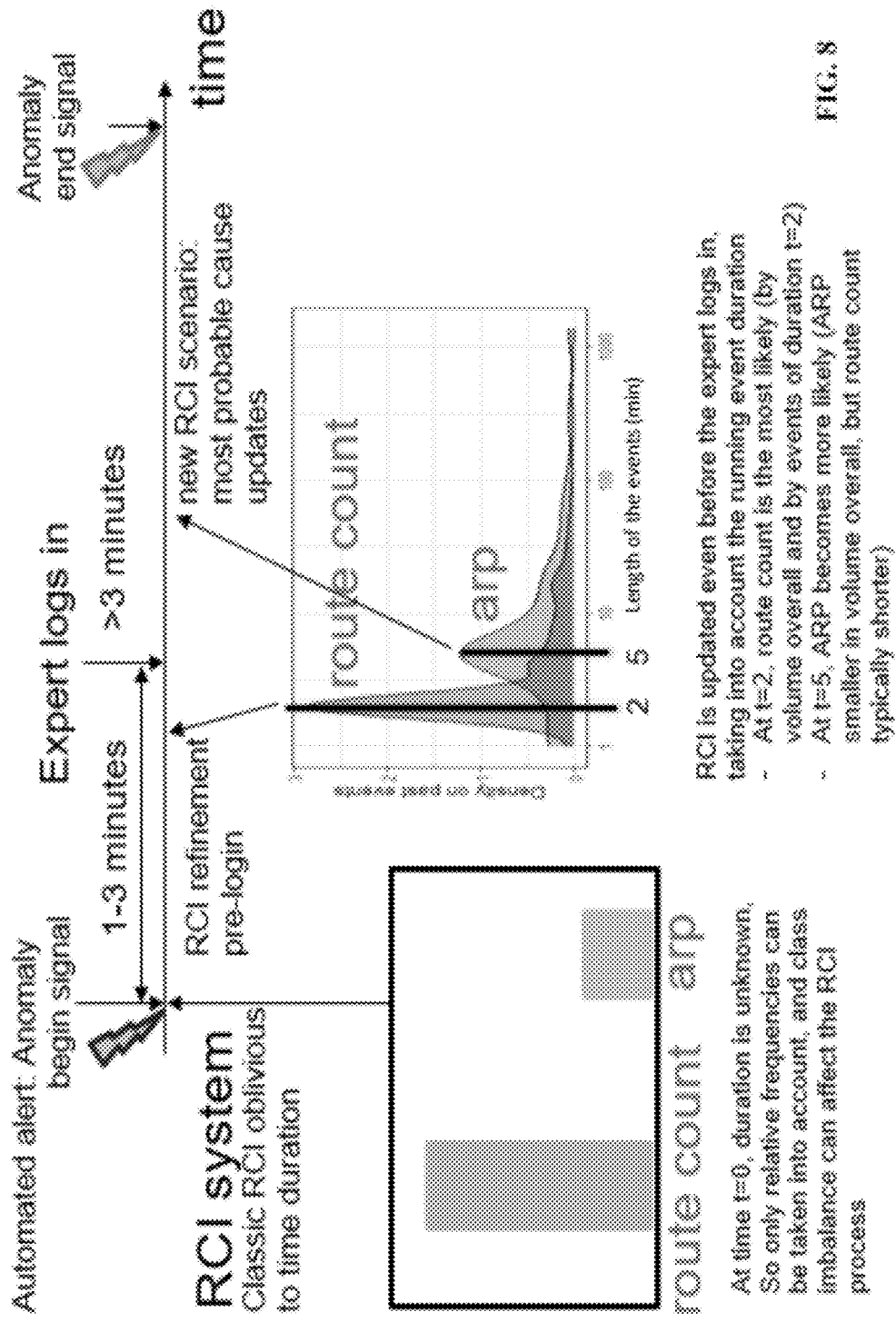
FIG. 8 shows an exemplary root cause analysis based on short/long event dichotomy.

FIG. 8 shows an example based on short/long event dichotomy. At the time the expert connects to the system to check the alert, the event is identified as equal distance (to the clusters) to both "route count" error and "ARP" error. Since most of the events are due to "route count" changes, it is the most probable root cause at the beginning (min 1-3), though this change later (at about min 5). This updated RCI recommendation helps reducing troubleshooting duration, making better use of valuable expert time.

Figure 9:
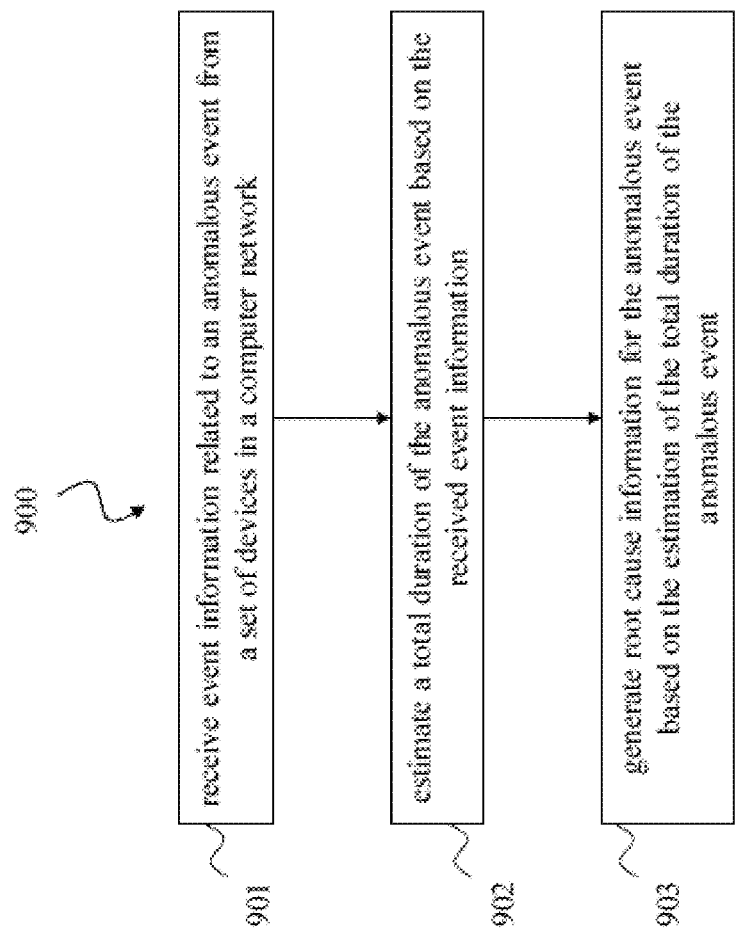
FIG. 9 shows a method according to an embodiment of this disclosure.

FIG. 9 shows a method 900 according to an embodiment of this disclosure. The method 900 is for root cause analysis of an anomalous event in a computer network. The method 900 may be performed by the apparatus 100. The method 900 may comprise a step 901 of receiving event information 101 related to the anomalous event from a set of devices 110 in the computer network. Further, the method 900 may comprise a step 902 of estimating a total duration 102 of the anomalous event based on the received event information 101. The method 900 may also comprise a step 903 of generating root cause information 103 for the anomalous event based on the estimation of the total duration 102 of the anomalous event.

The present disclosure has been described in conjunction with various embodiments as examples as well as implementations. However, other variations can be understood and effected by those persons skilled in the art and practicing the claimed matter, from the studies of the drawings, this disclosure and the independent claims. In the claims as well as in the description the word "comprising" does not exclude other elements or steps and the indefinite article "a" or "an" does not exclude a plurality. A single element or other unit may fulfill the functions of several entities or items recited in the claims. The mere fact that certain measures are recited in the mutual different dependent claims does not indicate that a combination of these measures cannot be used in an advantageous implementation.

The invention claimed is:

1. An apparatus, comprising:
a memory configured to store instructions; and
one or more processors coupled to the memory and configured to execute the instructions to cause the apparatus to:
receive, from a first set of devices in a computer network, event information related to an anomalous event;
estimate, based on the event information, a total duration of the anomalous event to obtain an estimation of the total duration;
generate, based on the estimation, root cause information for the anomalous event;
perform a first query on a first database using the event information or first updated event information related to the anomalous event;
obtain, in response to the first query, first past event information; and
further generate or update, based on the first past event information, the root cause information.

2. The apparatus of claim 1, wherein the event information comprises an indication indicating a starting time of the anomalous event.

3. The apparatus of claim 2, wherein the one or more processors are further configured to execute the instructions to cause the apparatus to:
track, based on the indication, a current duration of the anomalous event;
update, based on the current duration, the estimation to obtain an updated estimation; and
update the root cause information based on the updated estimation when the updated estimation exceeds a determined threshold duration.

4. The apparatus of claim 3, wherein the one or more processors are further configured to execute the instructions to cause the apparatus to:
track the current duration until an end of the anomalous event;
calculate, based on the current duration, the total duration at the end; and
provide, based on the total duration at the end, final root cause information for the anomalous event.

5. The apparatus of claim 1, wherein the root cause information comprises one or more first possible root causes for the anomalous event.

6. The apparatus of claim 5, wherein the root cause information further comprises a confidence value for each of the one or more first possible root causes.

7. The apparatus of claim 6, wherein the one or more processors are further configured to execute the instructions to cause the apparatus to update the root cause information by performing at least one of:
adding one or more second possible root causes to the root cause information;
deleting one or more third possible root causes from the root cause information; or
modifying the confidence value.

8. The apparatus of claim 6, wherein the one or more processors are further configured to execute the instructions to cause the apparatus to:
request, from the first set, updated event information when the confidence value is below a threshold confidence value;
update, based on the updated event information, the estimation to obtain an updated estimation of the total duration; and
update, based on the updated estimation, the root cause information.

9. The apparatus of claim 1, wherein the event information comprises at least one of:
an identification of each device in the first set; or
a current anomaly detection score associated with the anomalous event.

10. The apparatus of claim 1, wherein the event information comprises a second set of first scored features of the anomalous event, and wherein each of the first scored features comprises a feature of the anomalous event that is associated with a score indicating an influence of the feature to a root cause of the anomalous event.

11. The apparatus of claim 10, wherein the one or more processors are further configured to execute the instructions to cause the apparatus to:
compare the first scored features with second scored features of past anomalous events in past event information to obtain a result;
determine one or more clusters for the second set based on the result and estimated distances of the first scored features to centroids of the one or more clusters;
further estimate, based on total durations of the past anomalous events corresponding to the first scored features, the total duration to obtain the estimation; and
further generate, based on one or more root causes associated with the one or more clusters and the estimation, the root cause information.

12. The apparatus of claim 1, wherein the one or more processors are further configured to execute the instructions to cause the apparatus to further generate, based on past anomalous events, the root cause information, and wherein each of the past anomalous events has a known total duration of a corresponding past anomalous event.

13. The apparatus of claim 12, wherein the one or more processors are further configured to execute the instructions to cause the apparatus to:
perform a query on a database using the event information or updated event information related to the anomalous event;
obtain, in response to the query, past event information related to the past anomalous events; and
further generate or update, based on the past event information, the root cause information.

14. The apparatus of claim 13, wherein the past event information comprises one or more first scored features for each of the past anomalous events, and wherein each of the one or more first scored features comprises a feature of the corresponding past anomalous event that is associated with a score indicating an influence of the feature to a root cause of the corresponding past anomalous event.

15. The apparatus of claim 14, wherein the past event information further comprises cluster information regarding one or more clusters of second scored features of the past anomalous events, wherein each of the one or more clusters represents a different possible root cause, and wherein each third scored features of a corresponding cluster has a distance to a centroid of the corresponding cluster.

16. The apparatus of claim 15, wherein the past event information further comprises, for each of the one or more clusters, a distribution of total durations of second past anomalous events corresponding to the third scored features.

17. A method, comprising:
receiving, from a set of devices in a computer network, event information related to an anomalous event;
estimating, based on the event information, a total duration of the anomalous event to obtain an estimation of the total duration; and
generating, based on the estimation, root cause information for the anomalous event to rectify the anomalous event;
performing a first query on a first database using the event information or first updated event information related to the anomalous event;
obtaining, in response to the first query, first past event information; and
further generating or updating, based on the first past event information, the root cause information.

18. A computer program product comprising computer-executable instructions that are stored on a non-transitory computer-readable medium and that, when executed by one or more processors, cause an apparatus to:
receive, from a first set of devices in a computer network, event information related to an anomalous event in the computer network;

estimate, based on the event information, a total duration of the anomalous event to obtain an estimation of the total duration;

generate, based on the estimation, root cause information for the anomalous event to rectify the anomalous event;

perform a first query on a first database using the event information or first updated event information related to the anomalous event;

obtain, in response to the first query, first past event information; and further generate or update, based on the first past event information, the root cause information.

19. The computer program product of claim 18, wherein the event information comprises an indication indicating a starting time of the anomalous event.

20. The computer program product of claim 19, wherein the one or more processors are further configured to execute the computer-executable instructions to cause the apparatus to:

track, based on the indication, a current duration of the anomalous event;

update, based on the current duration, the estimation; and update the root cause information when the estimation exceeds a determined threshold duration.

* * * * *